US011847670B1

(12) United States Patent
Zhou et al.

(10) Patent No.: US 11,847,670 B1
(45) Date of Patent: Dec. 19, 2023

(54) SIMULATION AUGMENTED REINFORCEMENT LEARNING FOR REAL-TIME CONTENT SELECTION

(71) Applicant: Amazon Technologies, Inc., Seattle, WA (US)

(72) Inventors: Xinyu Zhou, Bellevue, WA (US); Xing Zhao, Oakland, CA (US); Qie Hu Huang, Sunnyvale, CA (US); Kirtan Modi, Seattle, WA (US); Jae In Cho, Hoboken, NJ (US); Jiahui Jeff Wang, Dublin, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/955,783

(22) Filed: Sep. 29, 2022

(51) Int. Cl.
  *G06Q 30/02* (2023.01)
  *G06Q 30/0251* (2023.01)
  *G06Q 30/0241* (2023.01)
  *G06Q 30/0273* (2023.01)

(52) U.S. Cl.
  CPC ..... *G06Q 30/0255* (2013.01); *G06Q 30/0275* (2013.01); *G06Q 30/0277* (2013.01)

(58) Field of Classification Search
  CPC ........... G06Q 30/0255; G06Q 30/0275; G06Q 30/0277
  See application file for complete search history.

(56) References Cited

U.S. PATENT DOCUMENTS

| 1,125,033 | A | * | 1/1915 | Doyle | ................... | B61H 13/02 74/147 |
| 8,341,033 | B2 | * | 12/2012 | Porat | ..................... | G06Q 40/04 705/26.4 |
| 2001/0037278 | A1 | * | 11/2001 | Messmer | ............... | G06Q 40/04 705/37 |
| 2021/0042787 | A1 | * | 2/2021 | Kleber | ................... | H04L 9/085 |

OTHER PUBLICATIONS

University of Chicago "Too Many Metrics" (Year: 2015).*
University of Chicago "Enhancing Model Robustness and Fairness with Causality" (Year: 2016).*
University of Chicago "Sensitivity Analysis of Individual Treatment Effects" (Year: 2022).*

* cited by examiner

*Primary Examiner* — Breffni Baggot
(74) *Attorney, Agent, or Firm* — Kilpatrick Townsend & Stockton LLP

(57) ABSTRACT

Systems, devices, and methods are described herein for improving inventory management. As used herein, "inventory" refers to digital space at an inventory providers webpage at which content can be delivered. The disclosed techniques utilize reinforced machine learning and an offline training process to train various models with which a content request corresponding to the inventory can be classified according to historical requests and a selection process identified for the request (e.g., a direct or an indirect selection process). If an indirect selection process is chosen, the content request may be optimized for that process utilizing additional machine learning models trained using reinforced machine learning and the offline training process. The disclosed techniques enable the inventory provider to optimize content selections according to a preferred objective. The training operations are performed offline, in a training system configured to simulate the run time environment.

19 Claims, 8 Drawing Sheets

SIMULATION AUGMENTED REINFORCEMENT LEARNING FOR REAL-TIME CONTENT SELECTION

BACKGROUND

Online inventory providers provide opportunities for various content to be delivered to online users. Conventional platforms configured to manage inventory (e.g., delivery opportunities) enable users to select from multiple selection processes. These selection processes are configured to identify what content to deliver from various content sources. Identifying which selection process and/or content source to utilize to optimize the inventory provider's objectives is nontrivial. Improvements are needed to such platforms to enable an optimal content selection process that maximizes the content provider's objectives to be chosen from the available selection processes. The data conventionally provided to some of these selection processes is deficient and causes content selection within that process to be suboptimal. Thus, improvements are needed to enable more optimal content selection to occur while simultaneously providing flexibility for the user (e.g., the inventory provider) to customize their inventory management experience.

BRIEF DESCRIPTION OF THE DRAWINGS

Various embodiments in accordance with the present disclosure will be described with reference to the drawings, in which.

DETAILED DESCRIPTION

Figure 1:
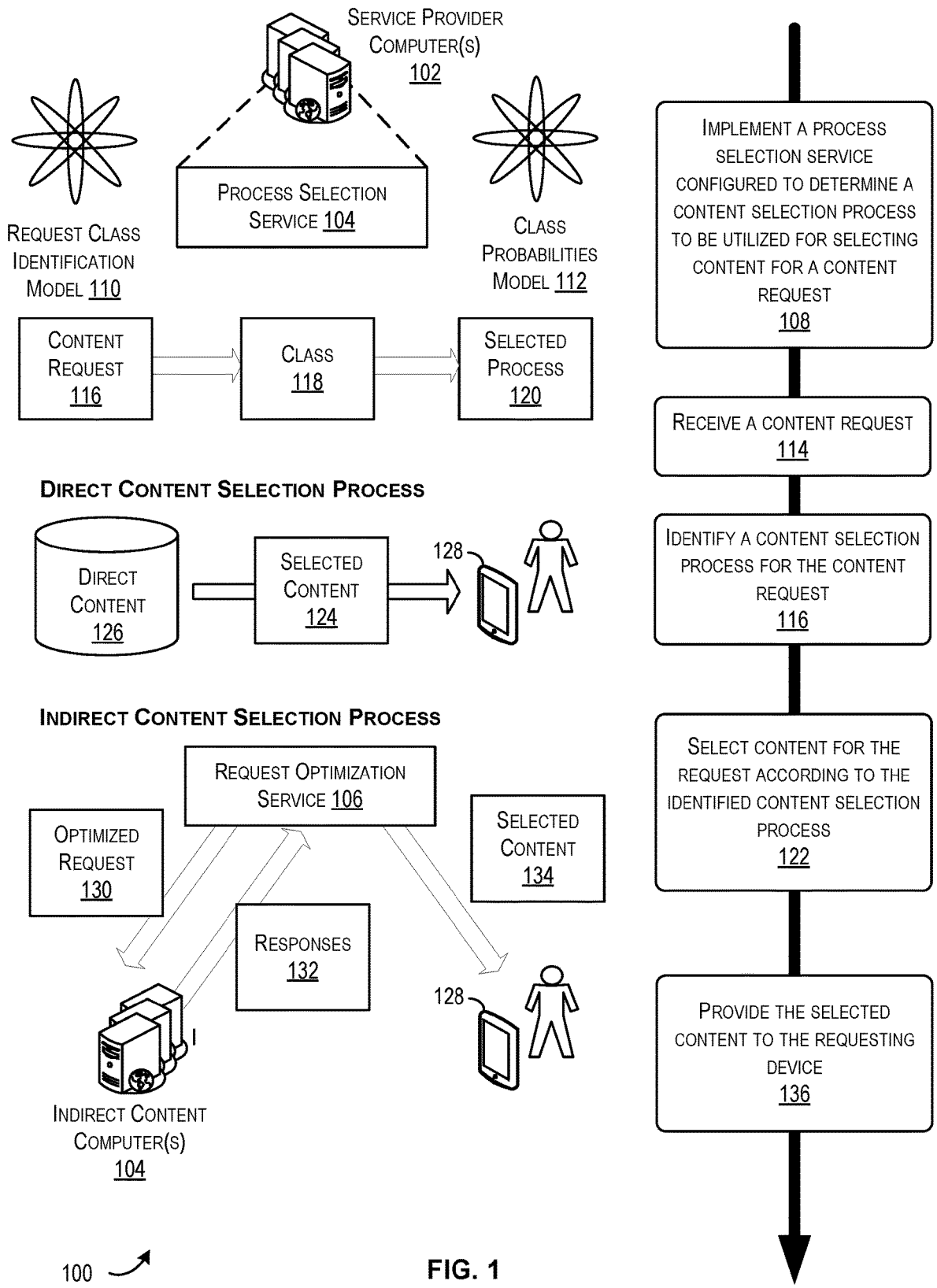
FIG. 1 illustrates an example flow for utilizing simulation augmented reinforcement learning for real-time content selection, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Online inventory providers provide digital space and opportunities for content to be delivered to online users (e.g., users to which the content is to be presented). Such content can include any suitable digital media such as video, audio, advertisements, and the like. Online inventory providers ("inventory providers," for brevity) may have various desired objectives. For example, these providers may desire content selection to be optimized with respect to increasing the viewing user's experience/satisfaction, to maximize inventory utilization, to maximize an outcome for providing such content, and the like.

In some embodiments, multiple content selection processes may be available. By way of example, one content selection process may include selecting content from a collection of digital content provided directly from a content provider. The delivery of content from this collection may conform to a set of predefined conditions and/or agreements between the inventory provider and the content provider. This content may be referred to herein as "direct content." Another available content selection process may include transmitting a request configured to solicit responses from multiple content providers for content and selecting content from the responses provided. In some embodiments, selecting one type of content (e.g., direct content) may be more advantageous to the inventory provider than selecting from other types of content (e.g., content proffered in response to a content request, herein after referred to as "indirect content"), but not necessarily so. Determining which type of content to utilize to provide an optimal result with respect to a given content delivery opportunity (e.g., an inventory instance) is nontrivial. Additionally, the data utilized to request indirect content from various content providers can be augmented to increase the relevance and return of the received responses.

An improved inventory management platform is disclosed that utilizes a process selection service and a request optimization service to increase user satisfaction (with respect to the online user, herein also referred to as the "viewing user") and optimize inventory management over conventional systems to maximize the likelihood of meeting the inventory provider's desired objectives (e.g., increasing the viewing user's experience, increasing views, increasing returns or outcomes, etc.). The process selection service may be configured to receive an inventory request and determine, from at least two available content selection processes, which content selection process is optimal for use with the given request. The request optimization service may be configured to optimize the request through augmenting request data, among other things, thereby increasing the relevance of corresponding responses, increasing the likelihood of a more optimal return or outcome, and increasing the likelihood of selecting content from those response that maximizes the inventory provider's desired objective. Each of these services may utilize artificial intelligence techniques and various machine learning models that can be developed, trained, and optimized offline using historical event data and an offline experiment platform. The offline experiment platform may execute concurrently to the services and may be configured to generate synthetic data and utilize simulation augmented reinforcement learning to continuously learn and optimize the models deployed to, and thus the strategies employed by, the process selection service and request optimization service, respectively. A multi-layered learning and knowledge transfer process may be utilized to deploy at least some of the models trained offline to online production with a balance of complexity, robustness, and response latency.

In real time, when an online user views the inventory provider's space (e.g., by visiting a website, accessing a streaming service, accessing a podcast, navigating using a mobile application, and the like), a content request ("a request," for brevity) may be received by the process selection service. Using machine learning models trained during the offline process described above, the process selection service may identify which content selection process to be utilized for the request from i) a content selection process for selecting direct content (hereinafter "a direct content selection process") or ii) a content selection process for selecting indirect content (hereinafter "an indirect content selection process"). If the indirect content selection process is chosen, the request may be transmitted to the request optimization service and various personalization models may be used to maximize response relevance and return.

The disclosed techniques enable an optimal content selection process to be identified and selected, the data utilized within these selection processes to be optimized, while avoiding real-time calculations for training the employed models. The models utilized by these services can be trained offline and updated periodically (e.g., each day, each week, etc.). Output generated by some of these models may be statically stored and accessible to the service to enable accurate determinations while minimizing the latency of making such determinations. The techniques employed for determining which content selection process is optimal may require a linear time computational complexity (i.e., O(n)). This type of computational complexity indicates a computational improvement (e.g., a reduction in the number of operations executed) over conventional techniques that utilized more-complex algorithms that are configured to make the same determination.

Moving on to the figures, FIG. 1 illustrates an example flow 100 for utilizing simulation augmented reinforcement learning for real-time content selection, in accordance with at least one embodiment. The operations of flow 100 may be performed by computing components of service provider computer(s) 102. By way of example, service provider computer(s) 102 may implement process selection service 104 and request optimization service 106 which are configured to collectively perform the operations discussed in connection with FIG. 1. The service provider computer(s) 102 may be configured to receive content requests, select an optimal content selection process (e.g., from a direct content selection process and an indirect content selection process), and provide selected content in response to the request. The service provider computer(s) 102 may be configured to optimize the content request data when an indirect content selection process is selected for request fulfillment.

The flow may begin at 108, where a process selection service (e.g., the process selection service 104) is implemented. The process selection service may be configured to determine a content selection process to be utilized for selectin content for a content request. In some embodiments, the process selection service 104 may be configured to determine whether an incoming request corresponding to a content delivery opportunity (e.g., digital space/an inventory instance) is to be fulfilled using a direct content selection process or an indirect content selection process. As described above, direct content may refer to digital content (e.g., advertisements) provided directly from a content provider. Instances of direct content may be associated with a set of predefined conditions and/or agreements between the inventory provider and the content provider (e.g., an advertiser). Indirect content is intended to refer to content obtained through an indirect content selection process in which a request is transmitted to multiple content providers to solicit proffers for content from which particular content may be selected and provided in response to the request. One example of an indirect content selection process may include an auction process in which the request is announced to a number of content providers, and any suitable combination of those content providers may bid on the request. A winner of the auction may be identified using the techniques disclosed herein and the winner's content may be provided in response to the request.

In some embodiments, the process selection service 104 may be configured to utilize a class identification model 110 that has been previously trained to identify a class for a newly received content request. The class identification model 110 may utilize any suitable unsupervised machine learning algorithm (e.g., a clustering algorithm) to group the content request to historical content request previously received by the system or otherwise identify a class for the content request. The class identification model 110 may be trained using historical event data of past requests using unsupervised machine-learning techniques as described in further detail with respect to FIG. 2.

In some embodiments, the process selection service 104 may be configured to utilize data generated by a class probabilities model 112. The class probabilities model 112 may be configured to generate a mapping that maps probability values to classes corresponding to types of requests. Each probability value indicates, for a particular class of requests (corresponding to a particular type of request), whether using one type of content selection process (e.g., an indirect content selection process) for filling the request is more optimal than another (e.g., a direct content selection process). Each probability value computed by the class probability model 112 and included in the mapping may correspond to a single class (e.g., type) of requests. The class probability model 112 may be trained using historical event data of past requests using reinforced machine-learning techniques as described in further detail with respect to FIG. 2.

At 114, a content request (e.g., content request 116) may be received (e.g., by the process selection service 104). The content request 116 may be received in response to a user (e.g., a consumer, a viewing user, etc.) triggering the content request 116 by visiting a webpage associated with the inventory provider (e.g., a publisher associated with the webpage). The content request 116 may include any suitable data including, but not limited to, information identifying the inventory provider, tagged customer behavior segments, demographic data associated with the viewing user, content genre, content rating, watching time (e.g., day, part of the day, time, etc.), and the like.

At 116, a content selection process for the content request 116 may be identified. By way of example, the content request 116 may be submitted as input to the class identification model 110 to identify the request belongs to class 118, one of a set of classes. The class 118 may be used to obtain a probability value from the mapping generated by the class probabilities model 112. If the probability value obtained meets or exceeds a predefined threshold, the process selection service 104 may be configured to select an indirect content selection process as the selected process 120. Otherwise, the process selection service 104 may be configured to select a direct content selection process as the selected process 120.

At 122, content may be selected for the content request according to the identified content selection process (e.g., the selected process 120). By way of example, if the selected process 120 is the direct content selection process, the selected content 124 may be selected from direct content 126. Once selected, the selected content 124 may be served to the user device 128 (e.g., a user device of the viewing user that initially triggered the content request 116).

Alternatively, content can be selected at 122 using the indirect content selection process. In this use case, a request optimization service 106 may be utilized to generate an optimized request 130 from the content request 116. The request optimization service 106 may be configured to add the most appropriate information by combining audience features and content features (e.g., male, age 18-34, college football, etc.) to make the request most valuable to the content providers (e.g., advertisers) who may pay the highest price. In some embodiments, the optimized request 130 may include a suggested lower threshold value (e.g., a floor price) for the given request. In some embodiments, the lower threshold value may be utilized to limit participation (e.g., by advertisers) in the indirect content selection process (e.g., an auction) (e.g., by excluding bids that have attributes that fall below or do not meet the lower threshold value). As a non-limiting example, a lower threshold value (e.g., a floor price) may specify a lowest value (e.g., bid price) that can be submitted by a content provider in response to the request. Any responses that include values that are lower than the lower threshold value may be ignored in the selection process. The lower threshold value may be identified by the request optimization service. Additional information related to generating the optimized request 130 using a variety of machine learning models is discussed in more detail below with respect to FIG. 4.

The optimized request 130 may be transmitted to the indirect content computer(s) 104 (e.g., via an advertisement auction) and responses 132 (e.g., bids) may be received, each identify a proffer of content to be delivered via the inventory (e.g., digital space corresponding to the content request 116) in exchange for a monetary amount to be provided by the corresponding indirect content provider (e.g., an advertiser). In some embodiments, the request optimization service 106 may be configured to provide a ranking score for each response (e.g., each bid) based on historical bidding price, brand safety, frequency management, relevancy, and the like. The request optimization service 106 may be configured to provide the ranked scores of the responses 132 from which a particular response (e.g., a winning bid) may be selected. The response may be selected based on identifying that selecting the response and delivering the corresponding selected indirect content 134 in response to the content request 116, will result in the maximum the return (e.g., revenue) being obtained.

At 136, the selected content (e.g., selected content 124 or selected content 134, depending on the selected process 120) may be provided to the requesting device (e.g., user device 128) in response to the content request 116.

Figure 2:
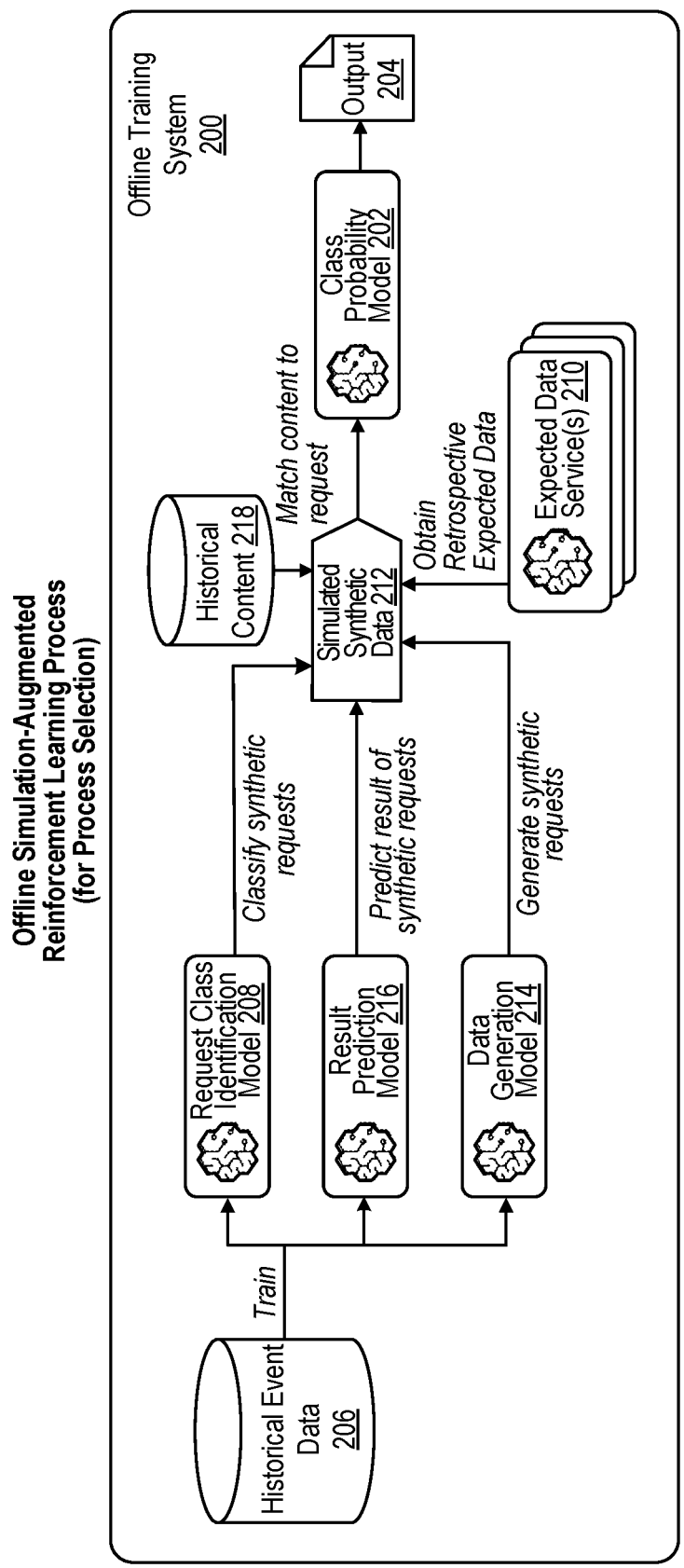
FIG. 2 illustrates a block diagram depicting a simulation environment configured to execute an offline simulation augmented reinforcement learning process to train and optimize various machine learning models utilized by the process selection service of FIG. 1, in accordance with at least one embodiment.

FIG. 2 illustrates a block diagram depicting an offline training system 200 configured to execute, offline, a simulation augmented reinforcement learning process to optimize various machine learning models utilized by the process selection service of FIG. 1, in accordance with at least one embodiment. As described above, the process selection service may be configured to determine whether an incoming request corresponding to a content delivery opportunity (e.g., digital space/an inventory instance) is to be fulfilled using a direct content selection process or an indirect content selection process.

The offline simulation system 200 depicted in FIG. 2 may be utilized to train a class probability model 202 to generate a mapping (output 204) that maps probability values to classes corresponding to types of requests. Each probability value indicates, for a particular class of requests (corresponding to a particular type of request), whether using one type of content selection process (e.g., an indirect content selection process) for filling the request is more optimal than another (e.g., a direct content selection process). Each probability value computed by the class probability model 202 may correspond to a single class (e.g., type) of requests. The class probability model 202 may be trained using historical event data 206 in addition to simulated synthetic data 208 generated by the offline training system 200 using reinforced machine-learning techniques as described below.

Reinforcement learning techniques refer to algorithms that include a computing agent that utilizes one or more predefined policies defining beneficial activity and non-beneficial activity and an overall desired objective (e.g., increased viewing user satisfaction, increased revenue, etc.). The computing agent may be configured to learn how to achieve the goal (e.g., in the ongoing context, maximizing outcomes with respect to the one or more predefined policies such as user experience metrics corresponding to the viewing user, resource conservation, revenue, inventory fulfillment, or the like) through rewarding beneficial activity and/or punishing non-beneficial activity in according with these predefined policies. Different reinforcement learning algorithm are configured to take different approaches. Some example reinforcement learning algorithms include multi-armed bandit algorithms, contextual bandit algorithms, or the like.

The role of the process selection service can be formulated as an optimization problem, which directly optimizes with respect to one or more objectives (e.g., increasing a metric such as total revenue, increasing clickthrough rates, etc.) in the future period (e.g., next 7 days). Specifically, a request set R may include any suitable number of content requests, each corresponding to a content delivery opportunity (e.g., an inventory instance) at which content may be delivered in a digital space provided by an inventory provider. Parameter V (e.g., a revenue value) may be calculated using the following equation:

$$V = \sum_r^R (\mathbb{1}_r \times IR_r + (1 - \mathbb{1}_r) \times (DR_r - DP_r)) \quad (1)$$

where $\mathbb{1}_r$ is an indicator function that indicates whether a given request r will be sent to an indirect content selection process. Two content selection processes (e.g., an indirect content selection process and a direct content selection process) may be available. As discussed above, the direct content selection process may be configured to fulfill the request (e.g., select content for the request) using direct content. As described above, direct content may be digital content provided directly from a content provider. The delivery of this type of content may conform to a set of predefined conditions and/or agreements between the inventory provider and the content provider.

Another available content selection process (e.g., an indirect content selection process) may include transmitting a request configured to solicit responses from multiple content providers for content and selecting content from the responses provided. By way of example, an indirect content selection process may include, among other things, an auction process that auctions inventory (e.g., digital space on the inventory provider's webpage) to various content providers (e.g., advertisers) according to predefined parameters. For example, in some embodiments, the content having a highest bid value (e.g., a highest monetary amount offered by any advertiser in exchange for serving their content at the inventory provider's webpage) may be selected as the winner of the auction. Content may be selected based on considerations other than the highest bid value. By way of example, the content may be selected based on identifying that it is most likely to increase the viewing user's satisfaction, to increase clickthrough rates (e.g., selections of the content), to increase the likelihood that inventory fulfillment is maximized, and the like. The specific objective(s) to which content selection is optimized may vary and may be defined by the user. Once selected, the content may be displayed at the digital space corresponding to the request (e.g., a portion of the inventory provider's webpage).

In the formula provided above, IR denotes a return (e.g., revenue) of utilizing indirect content (ads provided at auction), DR denotes a return (e.g., revenue) of utilizing direct content (e.g., direct deals between an advertiser and the inventory provider, a publisher), and DP as the penalty for selecting direct content (e.g., the penalty for not fulfilling direct content agreements fully). The summation $\Sigma IR_r$ denotes the sum of amounts corresponding to selected indirect content (e.g., winning auction bids) over the given time period. The summation $\Sigma DR_r$ represents the total return (e.g., income) from impressions delivered using direct content (e.g., Ad Deals previously negotiated between an advertiser and the inventory provider, a publisher) during the time period. The summation $\Sigma DP_r$ represents the sum of penalty costs as a consequence of unfulfilled instances of direct content (e.g., direct content that was not delivered during the time period).

It should be noted that some embodiments use revenue as the system objective to optimize the process selection service. However, revenue should not be the only consideration of the system design. Other important perspectives, such as user experience and satisfaction, may also be utilized for optimization purposes. As a non-limiting example, a publisher (an example of an inventory provider) can either maximize its revenue by inundating its inventory (digital space instances on its webpages) with advertisements, but it will provide a bad customer experience for end-users resulting in end-user churning and potentially impacting their long-term profit.

In general, the process selection service 104 may be configured to compute a probability that a given request will be fulfilled with the indirect content selection process (e.g., using an auction). In some embodiments, if the probability value is greater than a predefined threshold value (e.g., 0.5, 0.7, etc.), the process selection service 104 may be configured to select the indirect content selection process for filling the request. Otherwise, the process selection service 104 may be configured to select the direct content selection process for fulfilling the request.

Directly learning the probability from individual requests may have high variance and the model may not converge through training. Instead of identifying probabilities values to be used to decide between two available content delivery processes for each individual request, the request can be grouped (e.g., clustered using a clustering training algorithm, classified using a classification algorithm, etc.) with historic requests, each group (e.g., cluster) may correspond to a class, and a probability value may be computed that indicates whether requests of a given class are to be fulfilled using the indirect content selection process. A "clustering algorithm" refers to an unsupervised machine-learning algorithm that groups similar requests with one another and apart from dissimilar requests. By way of example, a clustering algorithm may be used to classify (e.g., cluster, group, etc.) requests based at least in part on information identifying the inventory provider, tagged customer behavior segments, demographic data associated with the user, content genre, content rating, watching time (e.g., day, part of the day, time, etc.), and the like. It is contemplated that classification algorithms (supervised algorithms) may be utilized to classify requests as having a classification that is the same for similar requests and that differs from classifications of dissimilar requests. Any example discussed herein which utilizes unlabeled data and a clustering algorithm is not intended to limit the scope of this disclosure and may be similarly applied utilizing labeled data and a classification algorithm. A model which uses either a classification algorithm or a clustering algorithm may be referred to as a "class identification model."

In some embodiments, the offline training environment 200 may be utilized to train a request class identification model (e.g., request class identification model 208) and a class probability model (e.g., class probability model 202) that may be used by the process selection service 104 to identify a class for an incoming request and to decide between fulfilling the request (e.g., selecting content) using the direct content selection process or fulfilling the request using the indirect content selection process.

Request class identification model 208 may be configured to identify a class for an inventory request as one of any suitable number of classes/classifications. By way of example, request class identification model 208 may be trained using a supervised or unsupervised machine-learning algorithm with historical event data 206 (e.g., previous examples in which a previous request was fulfilled with direct content or indirect content, the selected content, the available content, a predicted class corresponding to the request, and/or any suitable data corresponding to each fulfilled request) to identify a class for a request subsequently provided as input. If a supervised machine-learning algorithm is utilized, the historical event data may be labeled (e.g., with which selection process or type of content (direct versus indirect) was utilized to fulfill the request). In examples in which an unsupervised machine-learning algorithm is utilized, no such labels may be exist. A request may include any suitable data (e.g., gender, age, demographic, location, income, time of day, day of week, content genre, etc.) corresponding to the user whose actions (e.g., visiting the inventory provider's website) triggered the request and to whom the selected content will ultimately be delivered.

The term a may denote request class identification model 208, which may be periodically updated (e.g., every hour, every day, etc.) from the most recent information from a number of expected data services (e.g., expected data service(s) 210). Expected data service(s) 210 may include any suitable number of services, each of which may be configured to provide expected data (e.g., forecasted data for a subsequent time window) such as forecasted user information for future viewers, forecasted inventory data (e.g., digital spaces that are forecasted to be available for content delivery in a subsequent time window), forecasted direct content data indicated direct content (e.g., Ad Deals) forecasted for the subsequent time window, or the like. In some embodiments, forecasted user information may include a forecasted number of members (e.g., devices, individuals, households, etc.) for each audience (e.g., customer behavior group) and their potential watching time for the optimization time window. Forecasted inventory data may include an inventory limit for each delivery channel (e.g., advertisement channel) for the optimization time window. The forecasted direct content data may indicate any suitable metadata for all direct content instances (e.g., Ad Deal) and its corresponding fulfillment status. The request class identification model 208 may be configured classify an incoming request r to a class x∈X, where X is the entire class set of size N. Thus, the request class identification model 208 is represented as x=σ(r), where x∈X.

Each class x may be represented as an M-dimensional vector $x=[x_1, x_2, \ldots, x_M]$, where $x_i$ represents an explicit attribute (i.e., an environmental feature), such as the audience class, the inventory info, the ads deal class, etc. The class x with multiple explicit attributes $x_i$ can improve the interpretability of the process selection service 104, for further answering questions like which information (i.e., attribute $x_i$) plays a more important role over other attributes when determining if content should be selected for a request using the direct content selection process or the indirect content selection process.

The request class identification model 208 may be trained to classify each input request into a predefined class x. Given such a class, the system may ascertain how likely (e.g., a probability value indicating the likelihood) that the request r (belonging to class x) will be submitted to the indirect content selection process, instead of the direct content selection process. The class probability model 202 may be trained to identify such probability values using the class identified for the given request (e.g., the output of request class identification model 208, class x, for a given request) and forecasted data (e.g., forecasted future viewers and/or inventory information for a future time window, forecasted direct content for that time window, etc.).

In some embodiments, probability synchronization may be periodically performed by updating the forecasted data for a next time window as input to the class probability model 202 to obtain new probability values corresponding to each class x∈X. The process selection service 104 can provide request r and its class (e.g., class x=σ(r) as identified by the request class identification model 208) based on the current probability values corresponding to each class.

As part of an offline process performed by the offline training system 200, the class probability model 202 (ƒ(•)) with the optimal parameter set Θ may be trained from the historical event data 206 to maximize a given metric (e.g., the revenue) for a given time window. $I^t$ denotes an information set that may include audience forecast $F_A$, inventory forecast $F_I$, and forecasted direct deals $A_D$, for a given future time period (e.g., corresponding to the next hour, the next day, etc.). During a probability synchronization process performed by the offline training system 200, the forecasted information set $I^t=[F_A^t, F_I^t, A_D^t]$ for next time period t and the class set $X=[x_1, x_2, \ldots, x_N]$ corresponding to the classes identified for the forecasted requests may be applied to the previously trained class probability model 202 to obtain a new probability $p_r$ for each class x∈X. This process may be denoted by the following equation.

$$p_r = f(x|\langle I^t = [F_A^t, F_I^t, A_D^t], \hat{\Theta}\rangle) \quad (2)$$

The resulting probability set $P=[p_1, p_2, \ldots, p_N]$ may include a probability value corresponding to each class in class set X.

To minimize latency for the process selection service 104, real-time calculation steps are avoided by training the class probability model 202 offline using the historical event data 206 and updating the model periodically (e.g., each day, each week, etc.), during which the information set $I^t$ is updated for every given time window (e.g., each hour, the whole day, etc.). This offline process can be executed concurrently with the process selection service 104. The probability values generated by the class probability model 202 can be periodically saved as a static map or other lookup table for quick accessing. In production, the process selection service 104 may utilize the map to look up the previously generated probability value for a given class (e.g., the class x identified by the request class identification model 208. The processing time for obtaining the probability value (with which the content process may be selected) only requests a linear time computational complexity (i.e., O(1)).

To ensure the process selection service 104 maintains optimal performance, the offline training system 200 may be configured to implement a mirrored simulation enhanced learning environment to continuously learn and improve the models used by the process selection service 104. The offline training system 200 may be configured to generate synthetic data to train, develop, and compare the underlying machine learning models and approaches employed by the process selection service 104.

The offline training system 200 may be configured to generate synthetic data (e.g., simulated synthetic data 212) for all the required data sets in the real system (e.g., online system 300 of FIG. 3) and use the synthetic data to execute a simulation of the real-time system.

In some embodiments, data generation model 214 may be configured to utilize a statistical learning process to generate synthetic data instances of simulated synthetic data 212 from historical event data 206. In some embodiments, a statistical learning algorithm may be utilized to learn the probability distribution over the data instance space (e.g., historical request from the historical event data 206). The data generation model 214 may generate simulated synthetic data 212 based at least in part on probability distribution learned from historical event data 206.

Contextual information (e.g., forecasted data) for the synthetic requests may be obtained from the expected data service(s) 210. In some embodiments, the expected data service(s) 210 may be forecasting services configured to provide retrospective expected data (e.g., retrospective forecasted data indicating forecasted customer information, forecasted inventory, forecasted direct content, and the like). This retrospective expected data may be historical event data itself but corresponding to a time window after the time window corresponding to a synthetic request.

In some embodiments, result prediction model 216 may be trained utilizing any suitable supervised machine learning algorithm and known return values associated with examples of the historical event data 206 to identify a predicted return (e.g., predicted revenue) for subsequent requests provided as input.

Once generated, the synthetic data instances of simulated synthetic data 212 (e.g., synthetic content requests) may be provided as input to the request class identification model 208 to identify classes for each of the synthetic requests. The simulated synthetic data 212 may additionally or alternatively be provided to the result prediction model 216 to predict a resultant value (e.g., a revenue amount) for each synthetic data instance. Historical content 218 (e.g., historical direct content such as historical ad deals) may be used to match historical direct content instances (e.g., historical direct content that existed during historical time windows) to synthetic requests.

The class probability model 202 may be used with deep reinforcement learning techniques the synthetic data set 212 (including synthetic requests, corresponding class labels for each request, expected data indicating forecasted inventory/audience/content, etc.) to learn the best strategy for determining the probability value (a real number between 0 and 1 indicating whether to fulfill the request through the indirect content selection process or the direct content selection process) for each class. When the probability value meets or exceeds a predefined threshold, an outcome value can be determined (e.g., 1) indicating a selection of the indirect content selection process. Otherwise, a different outcome value (e.g., 0) may be used to indicate a selection of the direct content selection process). In some embodiments, multiple class probability models may be generated according to different strategies and/or objectives. These models may be evaluated, and an optimal model may be selected for production. In some embodiments, this process may be performed any suitable number of times to identify the class probability model 202 for a particular objective. By way of example, the class probability model 202 may be optimized according to revenue. In other examples, the simulated synthetic data 212 may include feedback indicating user satisfaction and the class probability model 202 may be trained to optimize for user satisfaction. Any suitable objective may be utilized to optimize the model. In some embodiments, the offline training system 200 may host one or more interfaces for obtaining user preferences regarding optimization parameters. Once optimized, the class probability model 202 may be selected and utilized to produce output 204 (e.g., a mapping between the classes and their respective probability values. In some embodiments, the request class identification model 208, the class probability model 202 and/or the output 204 may be deployed and used online by the process selection service 104.

The offline training system 200 may execute a simulation environment that 1) simulates the indirect content selection process and the direct content selection process, 2) trains various models including the request class identification model 208 and class probability model 202, and 3) selects the best machine learning models for online use.

The offline training system 200, through this mirrored simulation, enables the quick update of all the machine learning models and control algorithms of the process selection service 104 based on data and offline optimization. The simulations of the offline training system 200 can not only optimize the current models but also provide a virtual experiment environment for new machine learning models and decision algorithms. Once established, this simulation platform can be the virtual experiment environment for the future production version in the entire inventory management platform.

The class probability model 202 may include the following components: environment I, reward V, action A, and adjustable parameter set $\hat{\Theta}$. Thus, this probability-learning model (e.g., the class probability model 202) may be represented as:

$$f(x, I) \xrightarrow{\hat{\Theta}} p_r \quad (3)$$

where given a class $x=\sigma(r)$ for request r and the environment (information Set) I, the probability-learning model $f(\bullet)$ should optimize r's indirect process probability $p_r$ (action, the probability the indirect content selection process is selected) to maximize the reward V (e.g., revenue). The following reinforcement learning parameters may be utilized by a computing agent of the offline training system 200:

Environment—the environment may include the information set including the Forecast data $F_A$ (forecasted audience/user data), Forecast data $F_I$ (forecasted inventory), Forecast Content $A_D$ (forecasted direct content such as ad deals), in the given future time period (e.g., in a given hour, in a given day, etc.). The environment may be denoted by I=$[F_A, F_I, A_D]$.

Reward—the reward may include reward V (e.g., revenue value) of the given probability $p_r$ (e.g., indicating a probability that the indirect content selection process will be selected) for each class $x=\sigma(r)$.

Action—the action may be the probability $p_r \in P$ for a given request r that the indirect content selection process is selected. As in equation 1 above, $\mathbb{1}_r$ may be an indicator function (the decision) whether the request r should be submitted to the indirect content selection (CS) process corresponding to $\mathbb{1}_r=1$ or the direct CS process corresponding to $\mathbb{1}_r=0$. A mapping function may be generated that maps each $p_r$ to the decision $\mathbb{1}_r$. For given a random number $\epsilon \in [0,1]$, the decision $1_r$ for given probability $p_r$ for request r can be expressed as:

$$\mathbb{1}_r = \begin{cases} 1(\text{Submit to Indirect } CS \text{ Process}), & \text{if } \epsilon \le p_r = f(x = \sigma(r)|(I, \hat{\Theta})); \\ 0(\text{Submit to Direct } CS \text{ Process}), & \text{otherwise.} \end{cases} \quad (4)$$

Parameter Set—the parameter set may be considered the set of adjustable parameters $\Theta$ in the probability-learning model represented by equation 4. Model $f(\bullet)$ can be trained by taking each class $x \in X$ and it's logged environment I to maximize the reward V. $\hat{\Theta}$ may denote the optimized parameter set, and it will be used in online decision mapping optimization discussed below.

Example algorithmic steps for an algorithm for training class probability model 202 is provided below.

Example Training Algorithm

Input: Environment I=$[F_A, F_I, A_D]$; class $x \in X$ for Ad Request $r \in R$; Target update interval P; Reward decay rate $\gamma$.

Output: Optimized parametric policy $f$ with parameter set $\hat{\Theta}$.

1. Initialize policy $f_p$: $\mathbb{R}^{3D} \to \mathbb{R}^S$ to be a parametric model with parameter set $\Theta$;
2. Initialize target $f_g$ by $f_p$;
3. Initialize Memory $\mathcal{M}$;
4. For $r \in R$, do:
{
   Create the state $u_r=[x_r, F_{A_r}, F_{I_r}, A_{D_r}]$;
   Get probability for r from policy: $p_r=f_g(X_r, F_{A_r}, F_{I_r}, A_{D_r})$;
   Pick a random number E;
   Get action $\mathbb{1}_r$:

$$\mathbb{1}_r = \begin{cases} 1(\text{Submit to Indirect } CS \text{ Process}), & \text{if } \epsilon \le p_r; \\ 0(\text{Submit to Direct } CS \text{ Process}), & \text{otherwise.} \end{cases}$$

Get reward $V_r = \mathbb{1}_r \times AR_r + (1 - \mathbb{1}_r) \times (DR_r - DP_r)$;
if r>1, do:
{
   Append $[u_{r-1}, p_r, u_r, V_r]$ to memory $\mathcal{M}$;
   Deep—$Q(f_p, f_g, \mathcal{M}, \gamma)$;
} end
if mod(r, P)==0, then
{
   Sync the parameter set $\Theta$ of $f_g$ by those of $f_p$;
} end
} end
return $f$ with optimized parameter set $\hat{\Theta}$.

Figure 3:
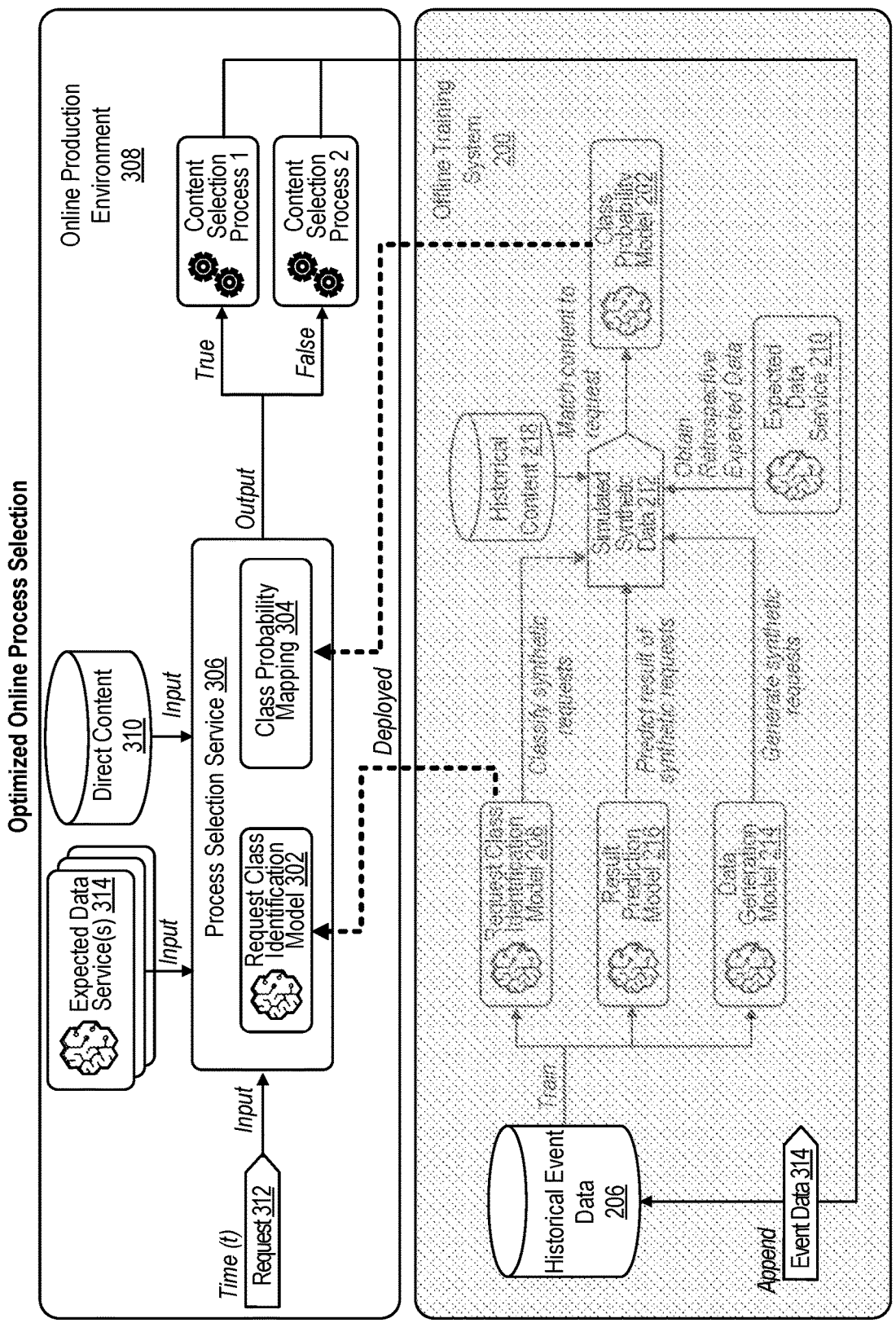
FIG. 3 illustrates a block diagram depicting an example process selection service configured to perform online process selection utilizing the models that have been optimized using the simulation environment of FIG. 3, in accordance with at least one embodiment.

FIG. 3 illustrates a block diagram 300 depicting an example process for online selection, utilizing models 302 and 304 that have been optimized using the simulation environment of FIG. 3, in accordance with at least one embodiment. The process depicted in FIG. 3 may be performed by the process selection service 306 (an example of the process selection service 104 of FIG. 1). The request class identification model 302 (an example of the request class identification model 202) and the class probability model 304 (an example of the request class identification model 204) may each be trained using the offline training system 200 in the manner discussed above in connection with FIG. 2. Once trained, the request class identification model 302 and class probability mapping 306 (an example of output 204 of FIG. 2) may be deployed to online production environment 308 for utilization by process selection service 306. Class probability mapping 306 may map the classes identifiable by request class identification model 302 to respective probability values indicating the likelihood a request belonging to a particular class will be fulfilled using content selection process 1 (e.g., an indirect content selection process) or process 2 (e.g., a direct content selection process which selects content from direct content instances. If selected, content selection process 1 may be configured to select content from direct content 310 (e.g., ad deals obtained directly from an advertiser and associated with metadata indicating a price and a set of requirements (e.g., indicating a direct content instance is to be delivered x number of times for a fixed price). Content selection process 2 may be configured to cause indirect content to be obtained (e.g., via one or more bids from an ad network, via one or more bids from one or more remote computers such as advertisement provider computers, etc.) and selected based at least in part on maximizing an objective (e.g., identifying the highest bid amount, identifying content that is predicted to result in a highest degree of user satisfaction, etc.).

At time (t), a request (e.g., request 312) may be received by the process selection service 306. Request 312 may be a content request triggered by a viewing user upon navigating to a webpage provided by an inventory provider (e.g., a publisher of the webpage that provides digital space on the webpage for delivery digital content).

The process selection service 306, upon receiving request 312, may provide request 312 to request class identification model 302 to obtain a classification (e.g., class x of class set X) for the request. Class probability mapping 304 may include probability values previously obtained (e.g., using class probability model 202) for each class x∈X, in the next time window t (e.g., the next hour). The classification identified for request 312 may be utilized with class probability mapping 304 to obtain probability value $p_r$. The process selection service 306 may be configured to decide whether to execute content selection process 1 should be utilized to select content for request 312 or, alternatively, if content selection process 2 should be utilized to select content for request 312. By way of example, if the probability value $p_r$ meets or exceeds a threshold value (e.g., 0.5, 0.7, 1, 0, etc.) the process selection service 306 may cause the content for request 312 to be selected using content selection process 1 (e.g., an indirect content selection process). Otherwise, the process selection service 306 may be configured to cause the content for request 312 to be selected using content selection process 2 (e.g., a direct content selection process). If content selection process 2 is utilized. The content for the request 312 may be selected from direct content 310 and provided in the digital space corresponding to the request 312. An example decision algorithm is provided below.

Example Decision Algorithm
   Input: Statically saved probability set $P=[p_1, p_2, \ldots p_N]$ for class set $X=[x_1, x_2, \ldots, x_N]$, Request Class identification model $\sigma$ (e.g., request class identification model 302), real-time request r (e.g., request 312).
   Output: Decision $\mathbb{1}_r$ for request r.
   1. Run Request Class identification model and get class x for r: $x = \sigma(r)$;
   2. Obtain probability $p_r$ for x through statically hash-mapping (e.g., from class probability mapping 304, an example of probability set P);
   3. Pick a random number $\epsilon$
   4. Get auction decision $\mathbb{1}_r$:

$$\mathbb{1}_r = \begin{cases} 1 (\text{Submit to Indirect } CS \text{ Process}), & \text{if } \epsilon \leq p_r; \\ 0 (\text{Submit to Direct } CS \text{ Process}), & \text{otherwise.} \end{cases}$$

Return $\mathbb{1}_r$.

At any suitable time, event data 314 corresponding to request 312 may be appended to the historical event data 206 as another example with which any of the models discussed in connection with FIG. 2 may be retrained.

Figure 4:
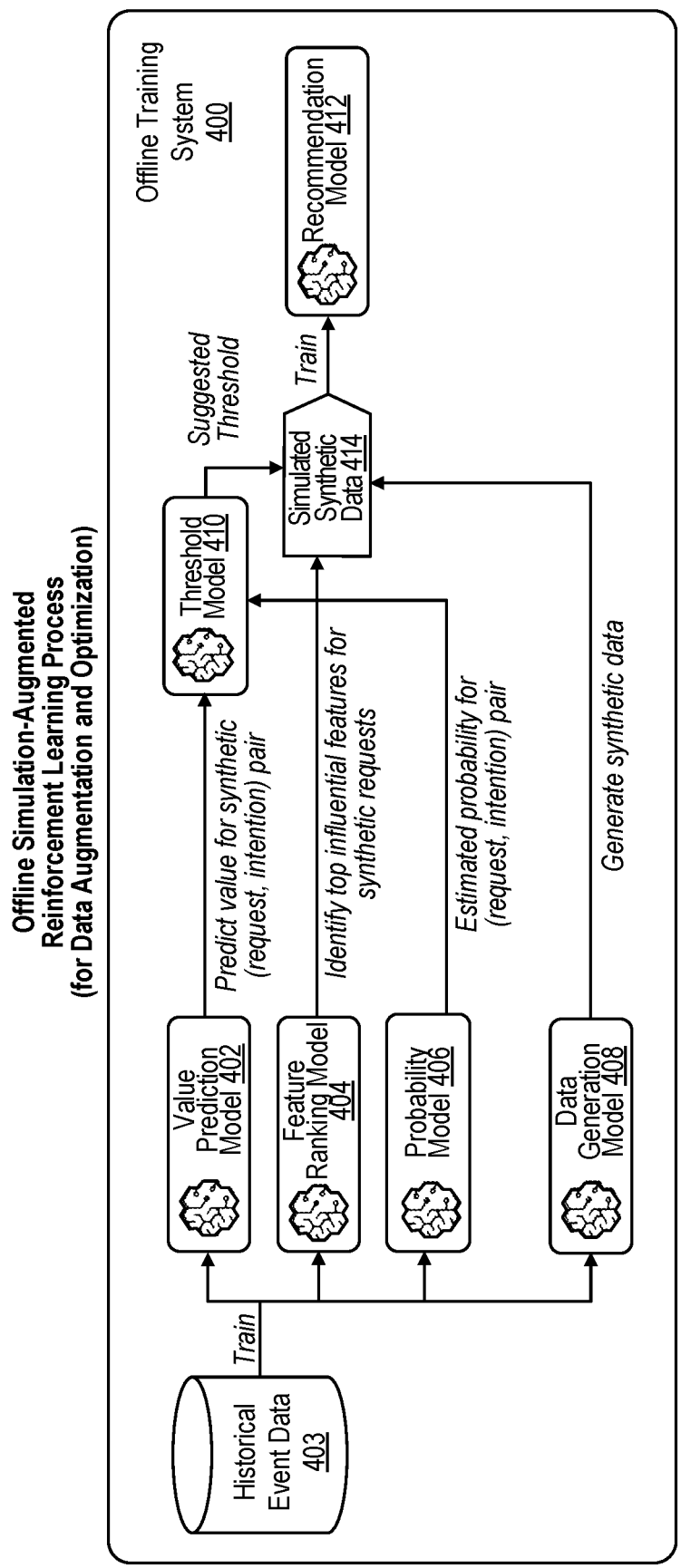
FIG. 4 illustrates a block diagram depicting a simulation environment configured to execute an offline simulation augmented reinforcement learning process to train and optimize various machine learning models utilized by the request optimization service of FIG. 1, in accordance with at least one embodiment.

FIG. 4 illustrates a block diagram depicting a simulation environment (e.g., offline training system 400) and an example reinforcement learning process for training a model to provide recommendations with respect to a content selection process, in accordance with at least one embodiment. Offline training system 400 may be an example of the offline training system 200 of FIG. 2. The offline training system 400 may be configured to train any suitable number of models to be utilized the request optimization service 106 of FIG. 1. As discussed above, the request optimization service 106 may be configured to provide recommendations for the indirect content selection process (e.g., an auction) to maximize the return obtained from the selected indirect content (e.g., the winning price). The request optimization service 106 may be configured to add the most appropriate information by combining audience features and content features (e.g., male, age 18-34, college football, etc.) to make the request most valuable to the content providers (e.g., advertisers) who may pay the highest price, and to provide a suggested lower threshold value (e.g., a floor price) for the given request. In some embodiments, the request optimization service 106 may be configured to provide a ranking score for each response based on historical bidding price, brand safety, frequency management, relevancy, and the like.

To add the most appropriate information combined the audience features and the content features and make the selection process most valuable to the content providers (e.g., advertisers) who may provide the highest value (e.g., the highest price), data optimization may utilize value prediction model 402, feature ranking model 404, probability model 406, and data generation model 408.

Value prediction model 402 may be trained utilizing any suitable supervised machine learning algorithm (e.g., a regression analysis algorithm) and historical event data 403 (an example of historical even data 206 of FIG. 2, that includes audience features, content features, winner's advertisement intentions (e.g., a category such as automobile, makeup, insurance, etc. associated with the winning content), the price of the winning price, etc.) to identify a function that maps inputs (e.g., a request including audience features and content features, an advertisement intention, etc.) to outputs (e.g., a predicted winning price for content ultimately selected for the request). In some embodiments, the value prediction model 402 may output a set of ranked advertisement intentions (e.g., content categories) with corresponding predicted prices for a given request.

A historical request r may include audience features (e.g., gender, age, education, location, etc.). The audience features of request r may be represented by a vector $W_A$. The request r may include content features (e.g., genre, content rating, part of the day, etc.) of this request as a vector $W_C$. The auction winner's intention (e.g., a category such as automobile, makeup, insurance, etc.) corresponding to this historical request may be denoted $a_{win}$ and the related closing price may be denoted $\rho_{close}$.

Using a regression machine learning algorithm, the value prediction model 402 ($\psi$) may learn the regression relationship between feature set $[W_A, W_C, a_{win}]$ and the closing price $\rho_{close}$: $\psi(W_A, W_C, a_{win}) \rightarrow \rho_{close}$. Through training with the historical event data 403, given an intention set A and the information $[W_A, W_C]$ (e.g., audience and content features, respectively, of request), the value prediction model 402 is configured to predict the winning price $\hat{\rho}_{win} = \psi(W_A, W_C, \alpha)$ for all intentions $a \in A$. Ultimately, the value prediction model $\psi(\bullet)$ may output the sorted intentions $A^{TOP-N} = [a_1, a_2, \ldots, a_{|A|}]$ ranked by their predicted winning prices according to the equation below.

$$A = \arg \mathrm{sort}_{\searrow, N} \left( \psi(W_A^1, W_C^1, a_1), \psi(W_A^2, W_C^2, a_2), \ldots, \psi(W_A^{|A|}, W_C^{|A|}, a_{|A|}) \right) \quad (5)$$

Therefore, the final output from the value prediction model 402 is the sorted Intentions ranked by the predicted bidding price $(A, P) = [(a_1, \hat{\rho}_1), (a_2, \hat{\rho}_2), \ldots, (a_{|A|}, \hat{\rho}_{|A|})]$.

In some embodiments, feature ranking model 404 may be configured to identify a degree of importance for each of the features utilized by the value prediction model 402. The feature ranking model 404 may be trained (e.g., via unsupervised learning algorithm) to learn relationships between variables to learn which features are most important/influential to bidding price (e.g., features that are likely to increase the predicted price). The feature ranking model 404 can be configured to generate a list of most important features that can be used to predict the bidding price and/or a floor price (e.g., a lower threshold value) for a given request/intention pair. In some embodiments, the feature ranking model 404 may be configured to output a ranked list ranking the most important features for a given request.

After obtaining the sorted intentions (e.g., content categories) ranked by the predicted winning prices $(A, P) = [(a_1, \hat{\rho}_1), (a_2, \hat{\rho}_2), \ldots, (a_{|A|}, \hat{\rho}_{|A|})]$ from the value prediction model 402 ($\psi$), and the probability $\sigma p(a_i, r)$ of an intention $a_i \in A$ bidding for request r, the feature ranking model 404 $\gamma(\bullet)$ may be configured to generate the top-K most important features for decoration. Specifically, for each intention $a_i$, the feature ranking model 404 $\gamma(\bullet)$ may be configured to sort the features list W by importance to increase the predicted winning price $\hat{\rho}_i$ through the value prediction model 402. The features list W, sorted by importance as generated by the feature ranking model 404 may be expressed by the following equation.

$$W_i = \arg \mathrm{sort}_{\searrow} \left( \gamma(a_i, w_1, \psi), \gamma(a_i, w_2, \psi), \ldots, \gamma(a_i, w_{|w_A^i \cup w_C^i + w^{constrains}|}, \psi) \right) \quad (6)$$

where $w_i \in W_A^i \cup W_C^i \backslash W_{constrains}$ denotes each feature from audience feature set $W_A$ and content feature set $W_C$, and excludes the features given by inventory provider constraints, such as the inventory provider's (the publisher's) specified configurations and privacy restrictions.

After obtaining the sorted important features $W_i$ for each intention $a_i$ in A, the features may be weighted by the probability $\sigma(a_i, r)$ and the weighted importance for each feature summed to return the top-K important features as the final feature list $\mathbb{W}_r$, according to the following equation:

$$\mathbb{W}_r = \arg \mathrm{sort}_{\searrow, K} \left( \sum_{i=0}^{|A|} \varphi(a_i, r) \times \gamma(a_i, w_1, \psi), \ldots, \sum_{i=0}^{|A|} \varphi(a_i, r) \times \gamma(a_i, w_K, \psi) \right) \quad (7)$$

Thus, the final output from the Feature Ranking Model is the Top-K optimal selected Decoration Features $\mathbb{W}_r$.

The probability model 406 may be configured to estimate the probability that a given intention will bid the given request r. Probability model 406 ($\sigma(\bullet)$) can also be trained from the historical event data 403. Given an intention set $A = [a_1, a_2, \ldots, a_{|A|}]$ and request type set (each type corresponding to requests with same audience feature vector $W_A$ and content feature vector $W_C$) $R = [r_1, r_2, \ldots, r_{|R|}]$. A binary bidding matrix $H \in \{0,1\}^{|A| \times |R|}$ may be used to capture a given intention's bidding history, where $H_{a,r} = 1$ indicates that intention $a \in A$ has bid before on request type $r \in R$, otherwise $H_{a,r} = 0$.

A probability model $\sigma(\bullet)$ finds the optimal low-rank matrix $P^{|A| \times K}$ and $Q^{|R| \times K}$, representing intention latent factors and request type latent factors, respectively, such that $P \cdot Q^T$ is close to the original bidding matrix $H^{|A| \times |R|}$, where K is the predefined low rank. The objective function of probability model $\sigma(\bullet)$ is:

$$\arg \min_{P,Q} (H - P \cdot Q^T)^2 \quad (8)$$

For an optimal P and Q, we obtain probability matrix $\hat{H} = P \cdot Q^T$. In practice, for a given intention a and a request type r, the probability that a will bid r is:

$$\varphi(a, r) = \frac{H_{a,r}}{\sum_{i=1}^{|A|} H_{a_i,r}} \quad (9)$$

That is to say, for a given request type r, the total probabilities of intention $a \in A$ will bid r is $\Sigma_{a \in A} \sigma(a, r) = 1$.

The threshold model 410 may be configured to predict/suggest a threshold (e.g., a floor price for the auction) for a given request. In some embodiments, this threshold may be based at least in part on the top N intentions with the predicted bidding prices generated by the value prediction model 402, the feature list generated as output by the feature ranking model 404, and the probabilities (e.g., probabilities corresponding to each intention that identify the probability that the intention will bid the given request) as generated by the probability model 406.

For each request r, value prediction model $\psi(\cdot)$ (e.g., value prediction model 402) and probability model $\gamma(\cdot)$ (e.g., probability model 406) generated a list of sorted intentions ranked by the predicted price $(A, P) = [(a_1, \hat{\rho}_1), (a_2, \hat{\rho}_2), \ldots, (a_{|A|}, \hat{\rho}_{|A|})]$ and their associated probabilities $[\sigma(a_1, r), \sigma p(a_2, r), \ldots, \sigma(a_{|A|}, r)]$. Given this information, what is the expected bidding price for this request r? Two intentions may be provided as examples for further illustration.

By way of example, the intention "automobile" may be ranked highest by value prediction model 402 with predicted bidding price $\rho_{automobile} = \$90$, and the estimated probability of automobile bidding the request r is $\sigma$(automobile, r)=0.1 (e.g., indicating a 0.1 probability that an advertiser intending to provide content corresponding to an automobile will bid on the request r). As another non-limiting example, the intention "insurance" may be ranked in the next highest position in the list generated by the value prediction model 402 with a predicted bidding price $\rho_{insurance} = \$50$. The estimated probability that insurance will bid the request r is denoted $\sigma$(insurance, r)=0.9 (e.g., indicating a 0.1 probability that an advertiser intending to provide content corresponding to an automobile will bid on the request r).

In the ongoing example, setting the expected closing bid price close to $90 may cause the auction to fail since there is a lower chance (i.e., only 0.1) that automobile will bid this request r. Thus, the expected bidding price may consider both the predicted bidding price for each intention and their associated bidding probabilities according to the following equation:

$$E_r = \sum_{i=1}^{|A|} \psi(W_A, W_C, a_i) \times \varphi(a_i, r) \quad (10)$$

where $W_A$ and $W_C$ are the audience feature set and content feature set of request r.

Given the expected bidding price $E_r$ for request r, the suggested floor price may be denoted $B_r = \max(\theta(E_r, G_r), \text{Provider}_r)$ where $G_r$ is a guard-rail price, and Provider$_r$ is the provider's (e.g., the publisher's) specified minimum floor price. The guard-rail price may be the Manufacturer Suggested Retail Price (MSRP) type of price generated by a high-level value prediction model learned from ads financial data.

A fully optimized request (e.g., request r) may be modified to include the combination of the final feature list $\mathbb{W}_r$ and the suggested floor price $B_r$. The optimized request r may be announced and all potential content providers (e.g., advertisers) will have the opportunity to bid this auction for request r. After receiving the bid price from each advertiser, recommendation model 412 may be configured to rank the content providers not only based on the bidding price, but also based on their content effectiveness, the viewing users' satisfaction, publisher's brand safety, ad conflicts, etc. As a result, the final winner of request r will not necessarily be the content provider who gives the highest bidding price but must be the most optimal one—under all of the aforementioned considerations—through the recommendation process.

As discussed above with respect to the process selection service 104, offline simulation augmented learning may be employed for the request optimization service 106 using the historical event data 403 and synthetic traffic generated by the data generation model 408. The optimal trained models may be synchronized with the real production system. The simulated augmented learning for these models will similarly follow the ideas and platform structures discussed in connection with FIG. 2.

In some embodiments, data generation model 408 may be configured to utilize a statistical learning process to generate synthetic data instances of simulated synthetic data 414 from historical event data 403. In some embodiments, a statistic learning algorithm may be utilized to learn the probability distribution over the data instance space (e.g., historical request from the historical event data 403). The data generation model 408 may generate simulated synthetic data 414 based at least in part on probability distribution learned from historical event data 403. Once generated, the synthetic data instances (e.g., synthetic requests) may be individually provided to the value prediction model 402 to obtain prices for each intention with respect to the synthetic request (e.g., for each request/intention pair). Each synthetic request may be submitted as input to the feature ranking model 404 to obtain a top-k list of the most influential features for synthetic requests (e.g., the features most important for determining whether an intention will bid the request). Each synthetic request may be submitted as input to the probability model 406 to identify a probability for each request/intention pair that the intention will bid the request. The synthetic request, the predicted prices generated by the value prediction model 402 for that request, and the probability values generated by the probability model 406 for the synthetic request may be submitted to the threshold model 410 to identify a suggested threshold (e.g., a floor price) for the request. The synthetic request may be updated with any suitable combination of the data generated by any of the models discussed above.

The synthetic request may be modified to include the combination of the final feature list $\mathbb{W}_r$ and the suggested floor price $B_r$ for the synthetic request r. The optimized request r may be announced to the auction (e.g., by the request optimization service) and all potential content providers (e.g., advertisers) will have the opportunity to bid this auction for request r. After receiving the bid price from each content provider, recommendation model 412 may be configured to rank the content providers and/or content not only based on the bidding price, but also based on their content effectiveness, the viewing users' satisfaction, publisher's brand safety, ad conflicts, etc.

Figure 5:
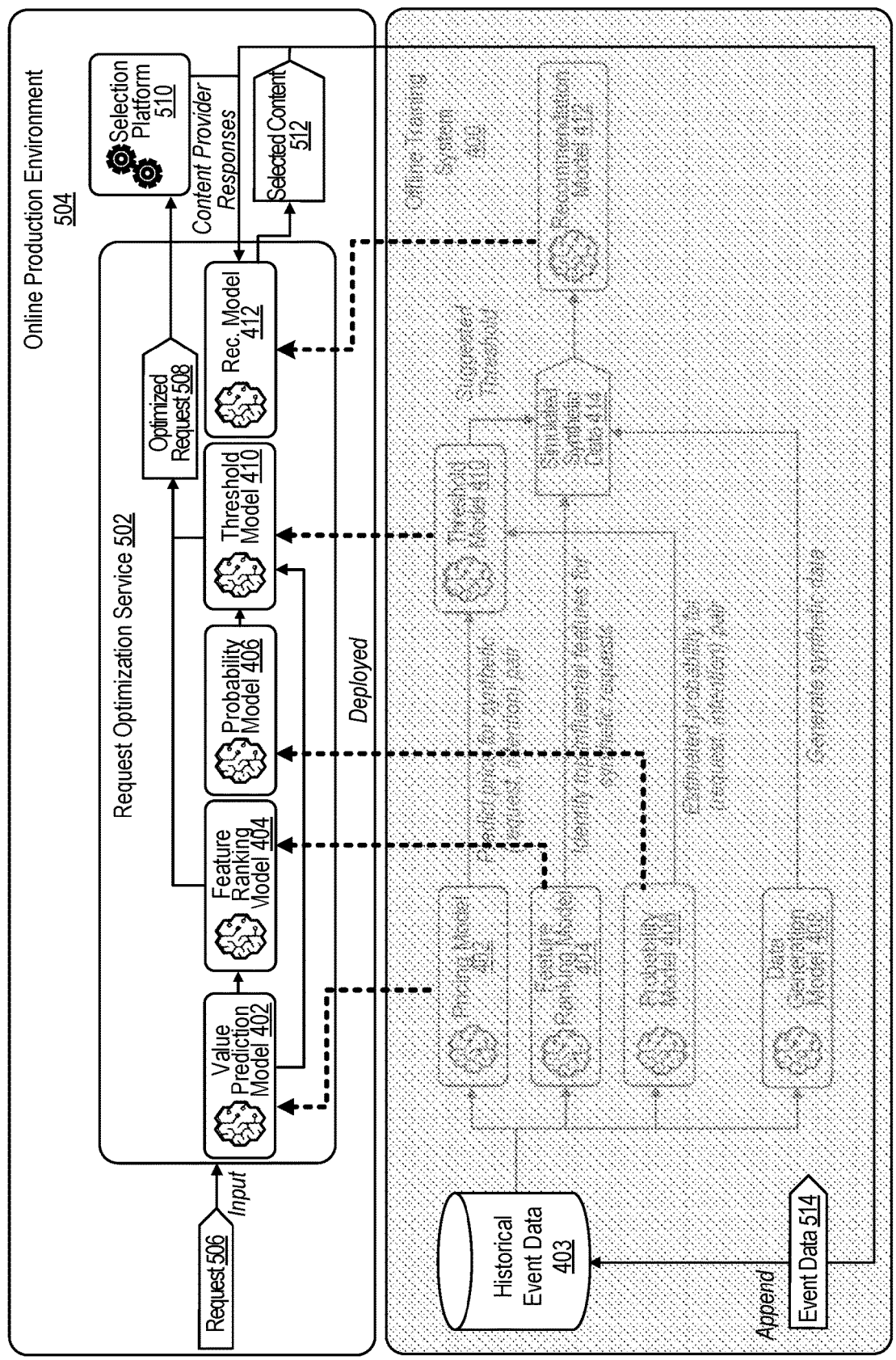
FIG. 5 illustrates a block diagram depicting an example request optimization service configured to optimize request data utilizing the models that have been optimized using the simulation environment of FIG. 4, in accordance with at least one embodiment.

FIG. 5 illustrates a block diagram depicting an example request optimization service 502 (an example of request optimization service 106 of FIG. 1) configured to optimize request data utilizing the models that have been optimized using the simulation environment of FIG. 4, in accordance with at least one embodiment. The value prediction model 402, feature ranking model 404, probability model 406, threshold model 410, and recommendation model 412 may each be trained using the offline training system 400 in the manner discussed above in connection with FIG. 4. Once trained, these models may be deployed to online production environment 504 for utilization by process selection service 502.

The request 506 may be received by the request optimization service 502 (e.g., from the process selection service 306 of FIG. 3). Request 506 may be a content request triggered by a viewing user upon navigating to a webpage provided by an inventory provider (e.g., a publisher of the webpage that provides digital space on the webpage for delivery digital content). The request r may be transmitted to the request optimization service 502 after the indirect content selection process has been chosen (e.g., by the process selection service 306) for request r, in accordance with the process discussed in connection with FIG. 3.

The request 506 may be provided as input to the value prediction model 402 and output indicating a predicted winning price corresponding to each pairing of the request with a known intention (e.g., known content categories) may be received from the value prediction model 402. By way of example, the value prediction model 402 may provide a sorted list of intentions ranked by the predicted winning prices.

The request 506 may be provided as input to the probability model 406 and output identifying estimated probability values for each request/intention pair may be provided by the probability model 406. The estimated probability values may identify a probability that a content provider having a given intention (e.g., an intention to bid with content associated with a particular content category) may bid the request r. The sorted list of intentions ranked by the predicted winning prices output by the value prediction model 402 and the estimated probability values for each request/intention pairing provided by the probability model 406 may be provided as input to the feature ranking model 404 to obtain a sorted list of important features of the request ranked by importance. The sorted list of intentions ranked by the predicted winning prices output by the value prediction model 402 and the estimated probability values for each request/intention pairing provided by the probability model 406 may be provided as input to the threshold model 410 to obtain a suggested threshold (e.g., a floor price). The optimized request 508 may include the data of request 506 as augmented/optimized with the sorted list of important features of the request as provided by the feature ranking model 404 and the threshold generated by the threshold model 410.

The optimized request 508 may be announced to the selection platform 510 (e.g., an auction) and any suitable number of content providers (e.g., advertisers) of the selection platform 510 may provide corresponding responses. Each response may constitute a bid for request r. The content provider's computer may be configured to utilize the feature ranking and/or the suggested threshold when determining the features (e.g., intention, bid price) of their response. After receiving the bid price from each content provider, recommendation model 412 may be configured to provide as output a sorted ranking of multiple content providers not only based on the bidding price, but also based on their content effectiveness, the viewing users' satisfaction, publisher's brand safety, ad conflicts, etc. Selected content 512 may be selected based at least in part on identifying a highest ranked content provider from the output provided by the recommendation model 412. In some embodiments, the recommendation model 412 may be configured to output only the highest ranked content provider (e.g., the content provider with the highest bidding price) instead of a sorted ranking described above. The selected content 512 may be the content from the highest ranked content provider (e.g., the auction winner). The selected content 512 may be provided in response to the request 312 of FIG. 3.

At any suitable time, event data 514 corresponding to request 506 may be appended to the historical event data 403 as another example with which any of the models discussed in connection with FIG. 4 may be retrained.

Figure 6:
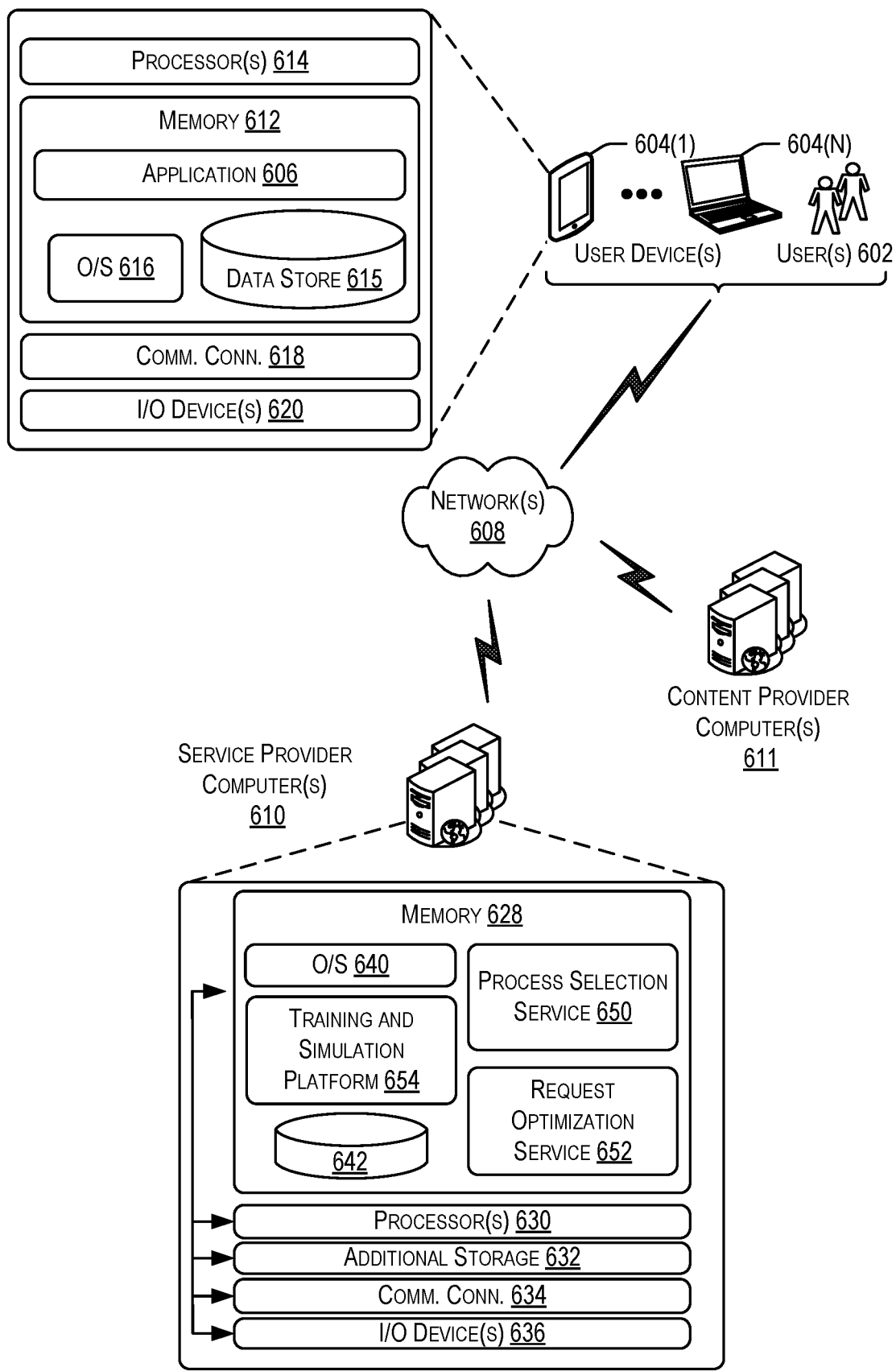
FIG. 6 illustrates components of an inventory management system, in accordance with at least one embodiment.

FIG. 6 illustrates components of an inventory management system 600, in accordance with at least one embodiment. In system 600, one or more user(s) 602 (e.g., publishers, content viewing users, etc.) may utilize a user device (e.g., a user device of a collection of user device(s) 604) to access a user interface accessible through an application 606 running on the user device(s) 604 via one or more network(s) 608. In some aspects, the application 606 operating on the user device(s) 604 may be hosted, managed, and/or provided by a computing resources service or service provider, such as by utilizing one or more service provider computer(s) 610. In some embodiments, the application 606 may be a web browser (e.g., any suitable software application that is configured to access data on the World Wide Web/the Internet). User(s) 602 (e.g., publishers/inventory providers) may utilize the interfaces to provide historical event data (e.g., historical event data 206, historical event data 403 of FIG. 4), to interact with offline training systems 200 and/or 400 of FIGS. 2 and 4, respectively, to provide objective preferences indicating a preferred objective with which the models discussed herein are to be optimized.

When one of the user(s) 602 (e.g., a content viewing user) requests a webpage (e.g., webpage associated with a publisher), the application 606 may be configured to transmit a request to service provider computer(s) 610. Request 312 of FIG. 3 is an example of such a request.

In some examples, the network(s) 608 may include any one or a combination of many different types of networks, such as cable networks, the Internet, wireless networks, cellular networks, and other private and/or public networks. While the illustrated example represents the user(s) 602 accessing application functionality over the network(s) 608, the described techniques may equally apply in instances where the user(s) 602 interact with the service provider computer(s) 610 via the one or more user device(s) 604 over a landline phone, via a kiosk, or in any other suitable manner. It should be appreciated that the described techniques may apply in other client/server arrangements, as well as in non-client/server arrangements (e.g., locally stored applications, etc.). Additionally, in some embodiments, process selection service 650 (an example of the process selection service 306 of FIG. 3), the request optimization service 652 (an example of the request optimization service 502), and the training and simulation platform 654 discussed herein, may operate in whole or in part on the user device(s) 604. Thus, in some embodiments, the user(s) 602 (e.g., publishes/inventory providers) may access the functionality of the process selection service 650, the request optimization service 652, and/or the training and simulation platform 654, directly through the user device(s) 604 and/or through the service provider computer(s) 610 via user interfaces provided by the service provider computer(s) 610.

The service provider computer(s) 610, perhaps arranged in a cluster of servers or as a server farm, may host the application 606 operating on the user device(s) 604 and/or cloud-based software services. Other server architectures may also be used to host the application 606 and/or cloud-based software services. The application 606 operating on the user device(s) 604 may be capable of handling requests from the user(s) 602 and serving, in response, various user interfaces that can be rendered at the user device(s) 604. The application 606 operating on the user device(s) 604 can present any suitable type of website that supports user interaction, including search engine sites, news websites, social media websites, and the like. The described techniques can similarly be implemented outside of the application 606, such as with other applications running on the user device(s) 604.

The user device(s) 604 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user device(s) 604 may be in communication with the service provider computer(s) 610 via the network(s) 608, or via other network connections.

In one illustrative configuration, the user device(s) 604 may include at least one memory 612 and one or more processing units (or processor(s)) 614. The processor(s) 614 may be implemented as appropriate in hardware, computer-executable instructions, firmware, or combinations thereof. Computer-executable instruction or firmware implementations of the processor(s) 614 may include computer-executable or machine-executable instructions written in any suitable programming language to perform the various functions described.

The memory 612 may store program instructions that are loadable and executable on the processor(s) 614, as well as data generated during the execution of these programs. Depending on the configuration and type of user computing device, the memory 612 may be volatile (such as random access memory (RAM)) and/or non-volatile (such as read-only memory (ROM), flash memory, etc.). The user device(s) 604 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 612 may include multiple different types of memory, such as static random access memory (SRAM), dynamic random access memory (DRAM), or ROM.

Turning to the contents of the memory 612 in more detail, the memory 612 may include an operating system 616, one or more data stores 615, and one or more application programs, modules, or services provided via the application 606 (e.g., a web browser application, a shopping application associated with an online retailer, etc.). The application 606 may be configured to receive, store, and/or display a network page or other interfaces for interacting with the service provider computer(s) 610. The application 606 may include any suitable functionality for interacting with the service provider computer(s) 610. Additionally, the memory 612 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 604 may also contain communications connection(s) 618 that allow the user device(s) 604 to communicate with a stored database, another computing device or server (e.g., the service provider computer(s) 610), user terminals and/or other devices on the network(s) 608. The user device(s) 604 may also include I/O device(s) 620, such as a keyboard, a mouse, a pen, a voice input device, a touch input device, a display, speakers, a printer, etc.

In some aspects, the service provider computer(s) 610 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 610 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 610 may be in communication with the user device(s) 604 and/or other service providers via the network(s) 608 or via other network connections. The service provider computer(s) 610 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 610 may include at least one memory 628 and one or more processing units (or processor(s)) 630. The processor(s) 630 may be implemented as appropriate in hardware, computer-executable instructions, firmware, or combinations thereof. Computer-executable instruction or firmware implementations of the processor(s) 630 may include computer-executable or machine-executable instructions written in any suitable programming language to perform the various functions described.

The memory 628 may store program instructions that are loadable and executable on the processor(s) 630, as well as data generated during the execution of these programs. Depending on the configuration and type of service provider computer(s) 610, the memory 628 may be volatile (such as RAM) and/or non-volatile (such as ROM, flash memory, etc.). The service provider computer(s) 610 or servers may also include additional storage 632, which may include removable storage and/or non-removable storage. The additional storage 632 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 628 may include multiple different types of memory, such as SRAM, DRAM, or ROM.

The memory 628, the additional storage 632, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 628 and the additional storage 632 are all examples of computer storage media. Additional types of computer storage media that may be present in the service provider computer(s) 610 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 610. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 610 may also contain communications connection(s) 634 that allow the service provider computer(s) 610 to communicate with a stored database, another computing device or server (e.g., content processing computer(s) 611, any of which may be an example of the content provider computer(s) associated with content providers (e.g., advertisers) of in connection with the figures above, user terminals and/or other devices on the network(s) 608. The service provider computer(s) 610 may also include I/O device(s) 636, such as a keyboard, a mouse, a pen, a voice input device, a touch input device, a display, speakers, a printer, etc.

Turning to the contents of the memory 628 in more detail, the memory 628 may include an operating system 640, one or more data stores 642, and/or one or more application programs, modules, or services for implementing the features disclosed herein, such as the features provided by the process selection service 650 (an example of the process selection service 306 of FIG. 3), the request optimization service 652 (an example of the request optimization service 502 of FIG. 5), and the training and simulation platform 654 (an example of any suitable combination of the offline training systems 200 and 400 of FIGS. 2 and 4, respectively.

Figure 7:
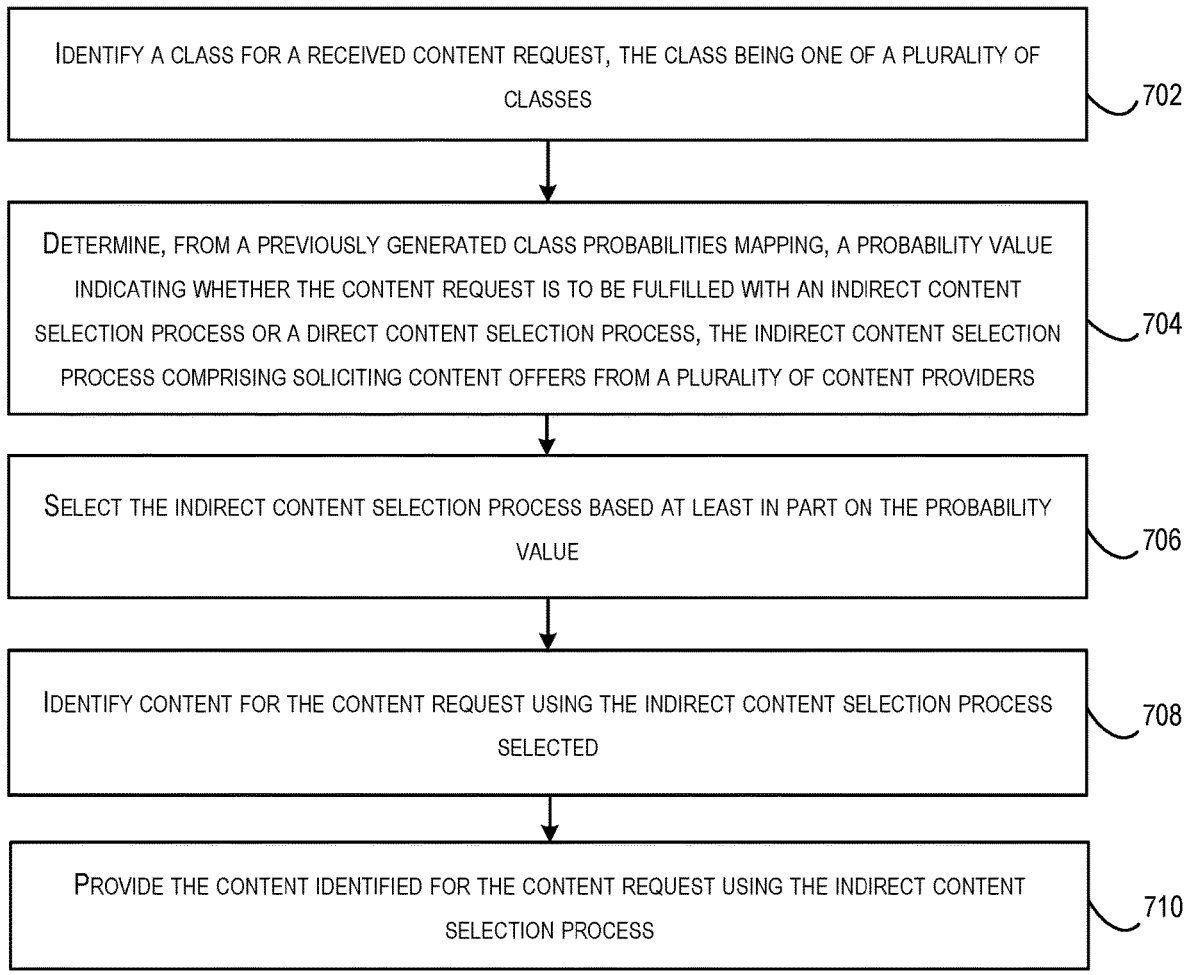
FIG. 7 includes a flowchart illustrating an example method for optimizing content selection with respect to online inventory management, in accordance with at least one embodiment.

FIG. 7 includes a flowchart illustrating an example method for 700 optimizing content selection, in accordance with at least one embodiment. A computer-readable medium may store computer-executable instructions that, when executed by at least one processor, cause at least one computer to perform instructions comprising the operations of the method 700. It should be appreciated that the operations of the method 700 may be performed in any suitable, not necessarily the order depicted in FIG. 7. Further, the method 700 may include additional, or fewer operations than those depicted in FIG. 7. The operations of method 700 may be performed by any suitable combination of the process selection service 650, the request optimization service 652, or the training and simulation platform 654 of FIG. 6, any of which may operate in whole or in part on a user device (e.g., one or more of the user device(s) 604 of FIG. 6) and/or the service provider computer(s) 610 of FIG. 6.

The method 700 may begin at 702, a class of a plurality of classes is identified (e.g., by the process selection service 306 of FIG. 3) for a received content request (e.g., content request 116 of FIG. 1). In some embodiments, the class for the received content request may be identified based at least in part on a class identification model (e.g., request class identification model 208 of FIGS. 2 and 3) that has been trained utilizing an unsupervised machine learning algorithm and historical event data corresponding to historical content requests. In some embodiments, the class identification model may be configured identify a corresponding class for a given content request provided as input. The training process for the class identification model may be discussed in more detail above in connection with the offline training system 200 of FIG. 2.

At 704, a probability value may be determined from a previously generated class probability mapping (e.g., class probability mapping 304). In some embodiments, the class probability mapping indicates whether the content request is to be fulfilled with an indirect content selection process or a direct content selection process. In some embodiments, an indirect content selection process (e.g., an auction) comprises soliciting content offers from a plurality of content providers while a direct content selection process comprises selecting content for fulfilling received content requests from direct content provided directly from a content provider (e.g., content that was not procured via the indirect content selection process).

At 706, the indirect content selection process may be selected (e.g., by the process selection service 306) based at least in part on the probability value. By way of example, if the probability value for the class corresponding to the content request meets or exceeds a threshold value (e.g., 0.5, 0.8, etc.), the indirect content selection process may be selected. Otherwise, the direct content selection process may be selected.

At 708, content may be identified for the content request using the indirect content selection process selected. As a non-limiting example, the content request may be provided to the request optimization service 502 of FIG. 5 and optimized/augmented according to the operations discussed above in connection with FIG. 5. By way of example, the content request may be augmented with a list of importance features (e.g., a ranked list of features of the content request) and a floor price for an auction. Once optimized, the content request may be announced to a set of content providers (e.g., via the selection platform 510 of FIG. 5, an online auction system). Responses from the content providers can be provided to a recommendation model (e.g., the recommendation model 412 of FIGS. 4 and 5). The recommendation model may be previously trained (e.g., using offline training system 400 of FIG. 4) to recommend a winning bid (e.g., one of the responses from the content providers) based at least in part on identifying that bid as optimizing the inventory provider's objective (e.g., maximizing revenue, increasing the viewing users' satisfaction, etc.).

At 710, the content identified for the content request using the indirect content selection process (e.g., selected content 134 of FIG. 1) may be provided to the requesting device (e.g., user device 128) in response to the content request.

Figure 8:
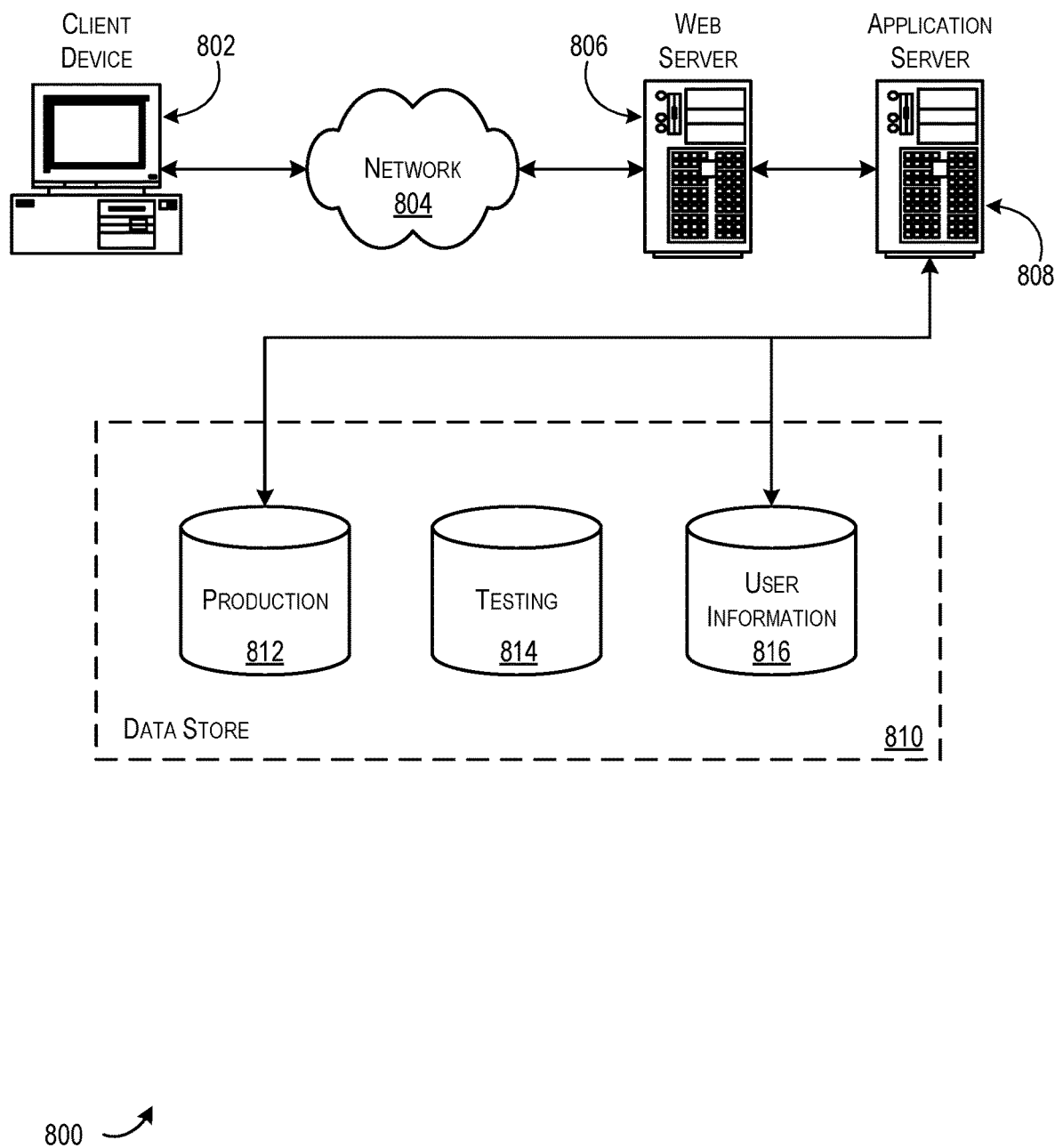
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes a user device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a result listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the environment 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements and figures in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for selecting content in response to a content request, the computer-implemented method comprising:
   implementing, by a processor of a computer system, an offline training system that is configured to train a class identification model and a class probability model using reinforced machine learning algorithms, the class probability model being configured to generate class probability values from which a class probability mapping is generated for real time use;

implementing, by the processor, a process selection service, the process selection service being configured to select a content selection process from a plurality of content selection processes, the plurality of content selection processes comprising an indirect content selection process and a direct content selection process;

deploying, by the processor, the class identification model and the class probability mapping to the process selection service, the class identification model being configured to identify a corresponding classification for a given content request provided as input, the class probability mapping being configured to map a plurality of classifications to corresponding probability values, each probability value indicating a probability that an instant content request corresponding to a given classification is to be fulfilled using the indirect content selection process;

receiving, by the processor in real time, the content request, the content request corresponding to a request for the content to be served at digital space provided by an inventory provider;

identifying, by the processor, a classification for the content request based at least in part on providing, to the class identification model that was deployed to the process selection service, the content request as input;

obtaining, by the processor, probability value corresponding to the classification based at least in part on obtaining, using the classification for the content request, the probability value from the class probability mapping that was deployed to the process selection service;

selecting, by the processor, the content selection process from the plurality of content selection processes based at least in part on the probability value obtained from the class probability mapping;

identifying, by the processor in real time, the content for the content request based at least in part on the content selection process selected; and providing, by the processor and in response to the content request, the content identified based at least in part on the content selection process selected.

2. The computer-implemented method of claim 1, wherein the class identification model utilizes a clustering algorithm to cluster the content request with previously classified content requests of the historical event data.

3. The computer-implemented method of claim 2, wherein the computing system further implements a request optimization service, the request optimization service being configured to augment the content request with additional data based at least in part on selecting the indirect content selection process as the content selection process.

4. The computer-implemented method of claim 3, wherein the additional data with which the content request is augmented comprises at least one of: a sorted list of features of the content request and a threshold value, the threshold value being used to limit participation by content providers in the indirect content selection process.

5. A system, comprising:
one or more processors; and
a memory storing executable instructions that, upon execution by the one or more processors, cause the system to execute operations to:
implement an offline training system that is configured to train a class identification model and a class probability model using respective machine learning algorithms, the class identification model being trained, utilizing historical event data corresponding to historical content requests, to identify a corresponding class for a given content request provided as input, and the class probability model being trained to generate class probability values from which a class probability mapping is generated for real time use;

deploy the class identification model and the class probability mapping for real time use;

identify, for a content request received in real time, a class of a plurality of classes, the class being identified based at least in part on the class identification model that has been previously deployed;

determine, from the class probability mapping deployed for real time use, a probability value indicating whether the content request is to be fulfilled with an indirect content selection process or a direct content selection process, the probability value being determined from the class probability mapping based at least in part on the class that was identified in real time for the content request, the indirect content selection process comprising soliciting content offers from a plurality of content providers;

select the indirect content selection process based at least in part on the probability value;

identify, in real time, content for the content request using the indirect content selection process selected; and provide, in real time, the content identified for the content request using the indirect content selection process.

6. The computing device system of claim 5, wherein executing the instructions further causes the system to:
train the class identification model utilizing an offline training process executed by the offline training system; and
train, by the offline training system, a class probability model utilizing a machine learning algorithm and the historical event data corresponding to historical content requests, the class probability model being configured to compute corresponding probability values for each of the plurality of classes, the corresponding probability values quantifying a probability that the indirect content selection process is selected to fulfill a subsequent request of belonging to each class.

7. The system of claim 6, wherein the offline training system further comprises a simulation environment, the simulation environment being configured with a data generation model, the data generation model being previously trained using a statistical learning algorithm and the historical event data to generate a synthetic data set comprising a plurality of synthetic content requests.

8. The system of claim 7, wherein executing the instructions further causes the system to:
identify, by the offline training system, a respective class for each synthetic content request of the synthetic data set, the respective class being identified using the class identification model trained by the offline training system;
predict, by the offline training system using a result prediction model, a resultant value for each synthetic content request, the result prediction model being previously trained using a supervised machine learning algorithm and the historical event data to predict a corresponding resultant value for a specific content request provided as input.

9. The system of claim 8, wherein executing the instructions further causes the system to:
train, by the offline training system, a plurality of class probability models using the synthetic data set as training data;

select, by the offline training system, the class probability model from the plurality of class probability models; and generate, by the offline training system, the class probability mapping using the class probability model and the synthetic data set.

10. The system of claim 5, wherein executing the instructions further causes the system to train a recommendation model utilizing an offline training process executed by the offline training system, the recommendation model being trained using a synthetic data set generated by a data generation model of the offline training system, the synthetic data being augmented with outputs of a value prediction model and a threshold model of the offline training system.

11. The system of claim 10, wherein the threshold model of the offline training system is configured to take as input a first output provided by the value prediction model, the value prediction model being configured to predict a set of values for a request of the synthetic data set, the set of values comprising a value for each of a set of content categories.

12. The system of claim 11, wherein the threshold model of the offline training system is configured to take as input a second output provided by a probability model of the offline training system, the probability model being configured to estimate the probability value for corresponding pairs individually comprising a synthetic request of the synthetic data set and a content category of the set of content categories, the probability value indicating a probability that content corresponding to a particular content category is submitted in a bid for the content request.

13. A computer-readable storage medium storing computer-executable instructions that, when executed by one or more processors of a computing system, cause the computing system to:

execute an offline training process that trains a class identification model and a class probability model using respective machine learning algorithms, the class identification model being trained to identify a corresponding class for a given content request provided as input, and the class probability model being trained to generate class probability values from which a class probability mapping is generated by the offline training process for real time use;

deploy the class identification model and the class probability mapping for real time use;

receive, in real time a content request for content to be delivered to a digital space provided by an online inventory provider;

determine, from the class probability mapping deployed for real time use, a value indicating that the content request is to be fulfilled with an indirect content selection process in lieu of a direct content selection process, the class probability mapping;

optimize the content request based at least in part on a plurality of machine learning models, a first machine learning model being configured to generate a ranked list of features of the content request, a second machine learning model being configured to generate a threshold value corresponding to a lower limit for participating in the indirect content selection process;

submit the content request as optimized to a plurality of content providers; and select, in real time, the content to serve at the digital space provided by the online inventory provider, the content being selected based at least in part on responses received from the plurality of content providers in response to submitting the content request as optimized.

14. The computer-readable storage medium of claim 13, wherein the content request is optimized by an online optimization service in real time, the online optimization service being configured with a second plurality of machine learning models that have been previously trained during the offline training process, the offline training process being performed by an offline training system.

15. The computer-readable storage medium of claim 14, wherein the offline training system provides a simulation environment and a corresponding plurality of machine learning models that simulate the plurality of machine learning models utilized as part of the online optimization service.

16. The computer-readable storage medium of claim 13, wherein the plurality of machine learning models comprise a value prediction model, a feature ranking model, a probability model, a threshold model, and a recommendation model.

17. The computer-readable storage medium of claim 16, wherein the content is selected further based at least in part on the recommendation model, the recommendation model being configured using reinforcement learning and the responses received from the plurality of content providers to identify a particular instance of content that provides an optimal result for the content request.

18. The computer-readable storage medium of claim 17, wherein executing the computer-executable instructions further causes the computing system to:

generate, during execution of the offline training process, a synthetic data set based at least in part on historical event data;

obtain, during execution of the offline training process, expected data from one or more expected data sources, the expected data comprising at least one of forecasted audience data, forecasted inventory data, or forecasted direct content instances; and train, during execution of the offline training process, the class probability model based at least in part on providing the expected data as training data.

19. The computer-readable storage medium of claim 13, wherein determining the value indicating that the content request is to be fulfilled with the indirect content selection process in lieu of the direct content selection process is performed by a process selection service in real time, and wherein the content request is optimized, in real time, by a request optimization service separate from the process selection service.

* * * * *